(12) United States Patent
Reimann

(10) Patent No.: US 6,480,121 B1
(45) Date of Patent: Nov. 12, 2002

(54) COMPREHENSIVE INFORMATION AND SERVICE PROVIDING SYSTEM

(76) Inventor: William Reimann, 14 Cloverdale Dr., Oakdale, NY (US) 11769

( * ) Notice: Subject to any disclaimer, the term of this patent is extended or adjusted under 35 U.S.C. 154(b) by 0 days.

(21) Appl. No.: 09/815,132

(22) Filed: Mar. 22, 2001

Related U.S. Application Data

(63) Continuation-in-part of application No. 09/514,445, filed on Feb. 28, 2000, now abandoned, which is a continuation-in-part of application No. 09/160,160, filed on Sep. 25, 1998, now abandoned.

(51) Int. Cl.$^7$ .............................................. G08G 1/123
(52) U.S. Cl. ............................ 340/990; 340/539; 705/1
(58) Field of Search ................................ 340/990, 991, 340/995, 539; 701/200, 201; 705/1

(56) References Cited

U.S. PATENT DOCUMENTS

| | | |
|---|---|---|
| 4,398,171 A | 8/1983 | Dahan et al. |
| 4,590,569 A | 5/1986 | Rogoff et al. |
| 4,774,672 A | 9/1988 | Tsunoda et al. |
| 4,896,154 A | 1/1990 | Factor et al. |
| 5,089,826 A | 2/1992 | Yano et al. |
| 5,200,902 A | 4/1993 | Pilley |
| 5,243,528 A | 9/1993 | Lefebvre |
| 5,389,934 A | 2/1995 | Kass |
| 5,410,486 A | 4/1995 | Kishi et al. |
| 5,543,789 A | 8/1996 | Behr et al. |
| 5,638,280 A | 6/1997 | Nishimura et al. |
| 5,652,707 A | 7/1997 | Wortham |
| 5,760,713 A | 6/1998 | Yokayama et al. |
| 5,848,373 A | 12/1998 | De Lorme et al. |
| 5,867,110 A | 2/1999 | Naito et al. |
| 5,963,948 A | 10/1999 | Shilcrat |
| 6,084,510 A * | 7/2000 | Lemelson et al. .......... 340/539 |
| 6,199,045 B1 * | 3/2001 | Giniger et al. ................. 705/1 |

* cited by examiner

Primary Examiner—John Tweel

(57) ABSTRACT

A service system is provided including a plurality of mobile and stationary units each having a plurality of components. Such components include, but are not limited to, a global positioning system for determining a longitudinal coordinate and a latitudinal coordinate of the current location of the mobile unit, a keypad or keyboard for inputting selected data, a display or converter for displaying graphic images and data, a speedometer for tracking the current speed of the mobile unit, an audible device for an alert notification, a meteorological sensor for weather data collection, a wired or wireless modem for connecting to a server, a direction sensor for tracking the current direction of travel of the mobile unit, a peripheral interface port for modem access of personal information devices, and a microprocessor for governing the transfer of information to and from the components of the embodiment. Also included is a service provider for generating and transferring information and control signals to and from the modems of each of the units via free space or land line for the purpose of providing various services and transferring graphic information.

36 Claims, 6 Drawing Sheets

COMPREHENSIVE INFORMATION AND SERVICE PROVIDING SYSTEM

CROSS REFERENCE TO RELATED APPLICATION

This application is a continuation-in-part of application Ser. No. 09/514,445, filed Feb. 28, 2000, now abandoned which is a continuation-in-part of application Ser. No. 09/160,160, filed Sep. 25, 1998, now abandoned.

BACKGROUND OF THE INVENTION

1. Field of the Invention

The present invention relates to information systems and more particularly pertains to a new comprehensive information and service providing system for providing various services to any type of transportation unit and the make.

2. Description of the Prior Art

The use of information systems is known in the prior art. More specifically, information systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art information systems and the like include U.S. Pat. Nos. 5,389,934; 4,774,672; 5,089,826; 5,243,528; 5,848,373; 5,867,110; 5,638,280; 5,963,948; 4,590,569; 4,896,154; 5,652,707; 4,398,171; 5,200,902; 5,410,486; 5,543,789; and 5,760,713, each of which are incorporated herein by reference.

In these respects, the comprehensive information and service providing system according to the present invention substantially departs from the conventional concepts and designs of the prior art, and in so doing provides an apparatus primarily developed for the purpose of providing various services to any type of transportation unit.

SUMMARY OF THE INVENTION

In view of the foregoing disadvantages inherent in the known types of information systems now present in the prior art, the present invention provides a new comprehensive information and service providing system construction wherein the same can be utilized for providing various services to any type of transportation unit.

The general purpose of the present invention, which will be described subsequently in greater detail, is to provide a new comprehensive information and service providing system apparatus and method which has many of the advantages of the information systems mentioned heretofore and many novel features that result in a new comprehensive information and service providing system which is not anticipated, rendered obvious, suggested, or even implied by any of the prior art information systems, either alone or in any combination thereof.

To attain this, the present invention generally comprises a plurality of mobile units each having a plurality of components. It should be noted that the mobile units may be mounted on any type of transportation means or simply hand held. In each of such embodiments, the components of the mobile units include a position demodulator utilizing global positioning system (GPS) or the like for determining a longitudinal coordinate and a latitudinal coordinate of a current location of the mobile unit. A keypad is provided for inputting selected data. For displaying graphic images and alphanumeric data, each mobile unit includes a color liquid crystal display. Identification read only memory is included for storing an accessible code combination unique to the mobile unit. A speedometer is provided for tracking a current speed of the mobile unit. An audible device is included for notifying the user of an imminent event. Also included is a direction sensor for tracking a current direction of travel of the mobile unit. Meteorological sensors may be included for the purpose of monitoring current weather data. A modem is adapted for transmitting and receiving data to and from a central server via free space. An external connector body is designated for peripheral interfacing from various personal information devices to the modem. Finally, a microprocessor is connected between the position demodulator, keypad, color liquid crystal display, memory, speedometer, audible device, direction sensor, meteorological sensors, modem and interface.

In use, the microprocessor serves to govern the transfer of information to and from the components of the mobile unit. As indicated earlier, the mobile units includes a plurality of vehicular and nautical mobile units each mounted within or retrofitted to a dash of a vehicle or watercraft. Each of the vehicular mobile units further have additional components including a vehicle impact sensor for indicating when a collision has occurred. Optionally, the impact sensor may be excluded in favor of an air bag deployment sensor. Note FIG. 1. Further included is an alarm system for indicating unauthorized use of the vehicle. Lastly, a voice recognition analog to digital converter is provided for inputting data without the use of hands. As shown in FIG. 2, the mobile units also include a plurality of nautical mobile units each mounted within a watercraft and further including a sonar receiver. FIG. 3 displays mobile units that include a plurality of portable mobile units each of which are hand held and also include a barometer. In FIG. 4, the units include a plurality of stationary units each located at a fixed location and further including a remote keyboard, CRT converter, and an authentication device. With reference now to FIG. 5, the mobile units include a plurality of aeronautical mobile units each mounted within an aircraft and further including an ILS receiver. Also included is a central service provider having a modem for transferring various information and control signals to and from the components of each of the mobile units via free space, as shown in FIG. 6. It should be noted that the service provider may be adapted to serve just vehicular units, nautical units, aeronautical units, locomotive units, hand-held units or any combination or part thereof. In addition, the service provider may be equipped in its apparatus to serve other kinds of units including fixed displays or any central data serving type units.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new comprehensive information and service providing system apparatus and method which has many of the advantages of the information systems mentioned heretofore and many novel features that result in a new comprehensive information and service providing system which is not anticipated, rendered obvious, suggested, or even implied by any of the prior art information systems, either alone or in any combination thereof.

It is another object of the present invention to provide a new comprehensive information and service providing system which may be easily and efficiently manufactured and marketed.

It is a further object of the present invention to provide a new comprehensive information and service providing system which is of a durable and reliable construction.

Yet another object of the present invention is to provide a new comprehensive information and service providing system which is of simple operation and interpretation.

An even further object of the present invention is to provide a new comprehensive information and service providing apparatus which is susceptible of a low cost of manufacture with regard to both materials and labor, and which accordingly is then susceptible of low prices of sale to the consuming public, thereby making such comprehensive information and service providing system economically available to the buying public.

Still yet another object of the present invention is to provide a new comprehensive information and service providing system which provides in the apparatuses and methods of the prior art some of the advantages thereof, while simultaneously overcoming some of the disadvantages normally associated therewith.

Still another object of the present invention is to provide a new comprehensive information and service providing system for providing various services amongst and between any type and any make of mobile transportation and portable hand-held and stationary fixed-based unit.

Even still another object of the present invention is to provide a new comprehensive information and service providing system that includes a plurality of mobile and stationary units each having a plurality of components. Such components include, but are not limited to, a position demodulator for determining a longitudinal coordinate and a latitudinal coordinate of a current location of the mobile unit, a keypad or keyboard for inputting selected data, a display or converter for displaying graphic images and alphanumeric data, a speedometer for tracking a current speed of the mobile unit, an audible device for notifying an alert, a direction sensor for tracking a current direction of travel of the mobile unit, meteorological sensors for monitoring weather conditions at a location of the mobile unit, a wired or wireless modem for connecting to a server, a peripheral interface link adapted for modem access, and a microprocessor for governing the transfer of information to and from the components of the embodiment. Also included is a central service provider for generating and transferring information and control signals to and from the modems of each of the mobile units via free space for the purpose of providing various services and a land line for the purpose of transferring information to and from the modems of each of the stationary units and external databases.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
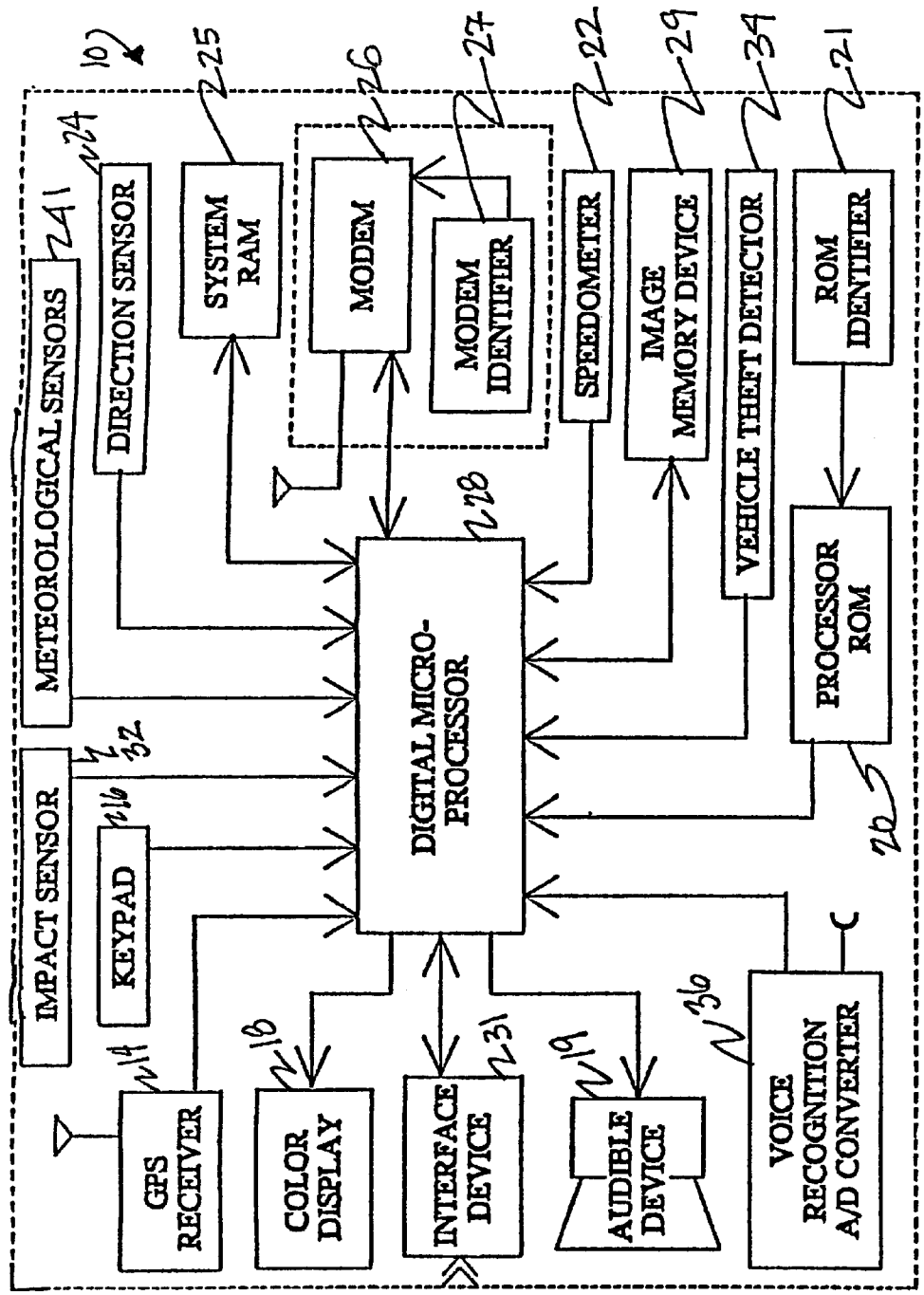
FIG. 1 is a schematic diagram of a vehicular embodiment of the mobile units of the present invention.

With reference now to the drawings, and in particular to FIGS. 1 through 6 thereof, a new comprehensive information and service providing system embodying the principles and concepts of the present invention and generally designated by the reference numeral 10 will be described.

The present invention includes a plurality of vehicular mobile units 10 each having numerous components. It should be noted that the mobile units may be mounted on any type of transportation means or simply hand held. In each of such mobile units, the components include a position demodulator 14 for determining a longitudinal coordinate and a latitudinal coordinate indicative of a current location of the mobile unit. A keypad 16 is provided for inputting selected data. The specific types of buttons will be set forth hereinafter. For displaying graphic images and alphanumeric data, each mobile unit includes a color liquid crystal display 18. Identification read only memory 21 and 27 are included for storing an accessible code unique to the mobile unit ROM 20 and modem 26. The identification read only memory may also take an additional form of random access memory 25 by which a code may be frequently changed in order to validate a fraudulent identification combination as being copied and in use by an unauthorized person. A speedometer 22 is provided for validating a current speed of the mobile unit. Also included is an audible device 19 for notifying an alert. Meteorological sensors 41 are incorporated for collecting current weather data. Further included is a direction sensor 24 for validating a current direction of travel of the mobile unit. The direction sensor and speedometer data, nevertheless, may be excluded from a central service provider 46 by means of its method of comparing the positioning change of the mobile unit between service intervals for accomplishing its essential task of image orientation that maintains both a concentric reference and graphic motion alignment with respect to the actual heading and motion of the vehicle. A modem 26 is adapted for transmitting signals and receiving data to and from the service provider via free space. A peripheral interface 31 connector body is provided for information transfer between another information device and the modem. Finally, a microprocessor 28 is connected between the position demodulator 14, keypad, color liquid crystal display, memory, speedometer, audible device, meteorological sensors, direction sensor, modem and interface. In use, the microprocessor 28 serves to govern the transfer of information and control signals to and from the components of the mobile unit.

As indicated earlier, the mobile units include a plurality of vehicular mobile units each mounted within or retrofitted to a dashboard of a terrestrial vehicle. If retrofitted, the mobile units may exclude in-vehicle sensor information readily obtainable from service tracking (i.e. speed, direction, elevation) as mentioned, supra. Each of the vehicular mobile units further has additional components including a vehicle impact sensor 32 for indicating when a collision has occurred. See FIG. 1. Optionally, the impact sensor may be excluded in favor of an air bag deployment sensor. Further included is a theft detector 34 for indicating unauthorized use of the vehicle. Lastly, a voice recognition analog to digital converter 36 is provided for inputting data without the use of hands.

Figure 2:
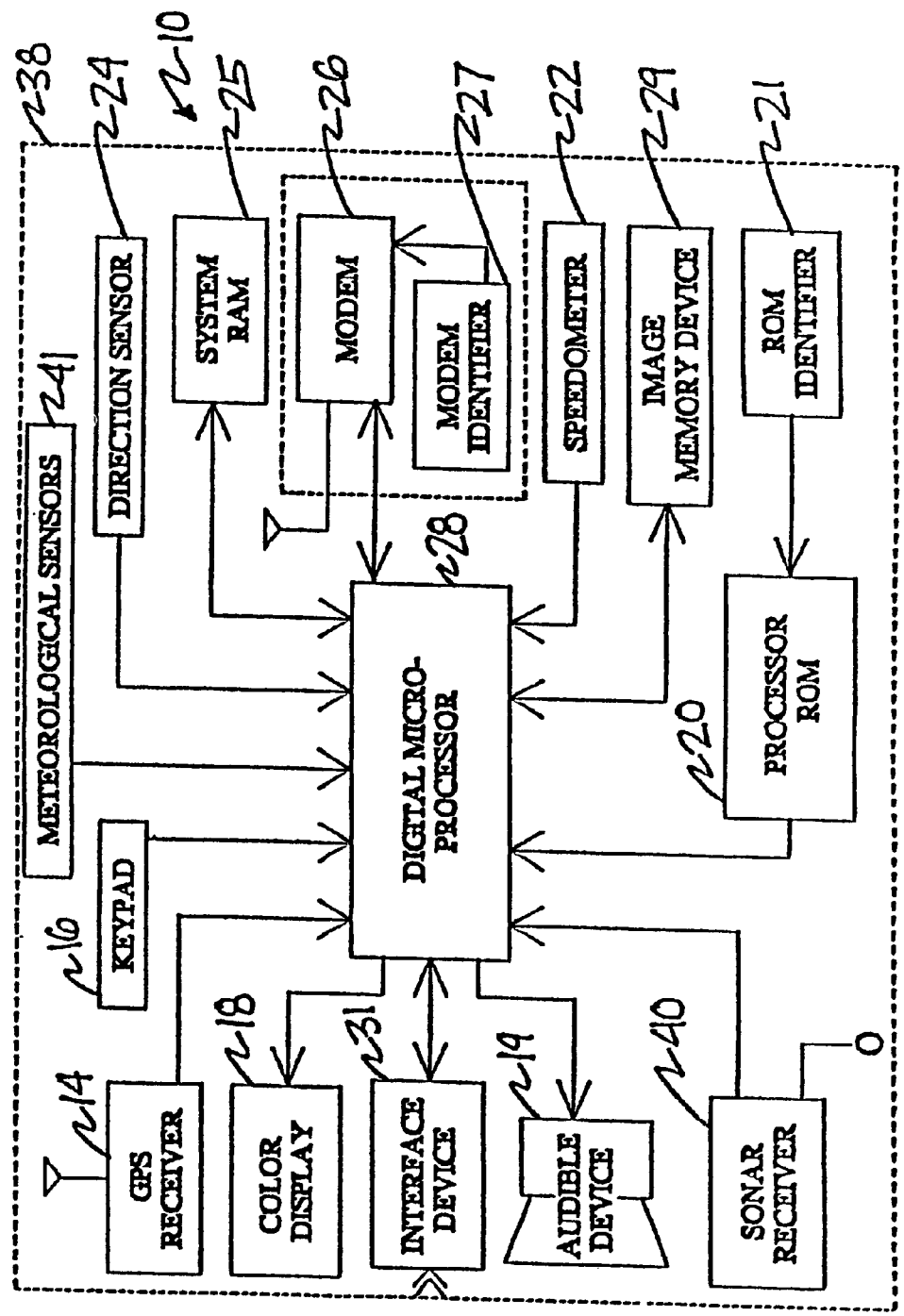
FIG. 2 is a schematic diagram of a nautical embodiment of the mobile units of the present invention.
Figure 3:
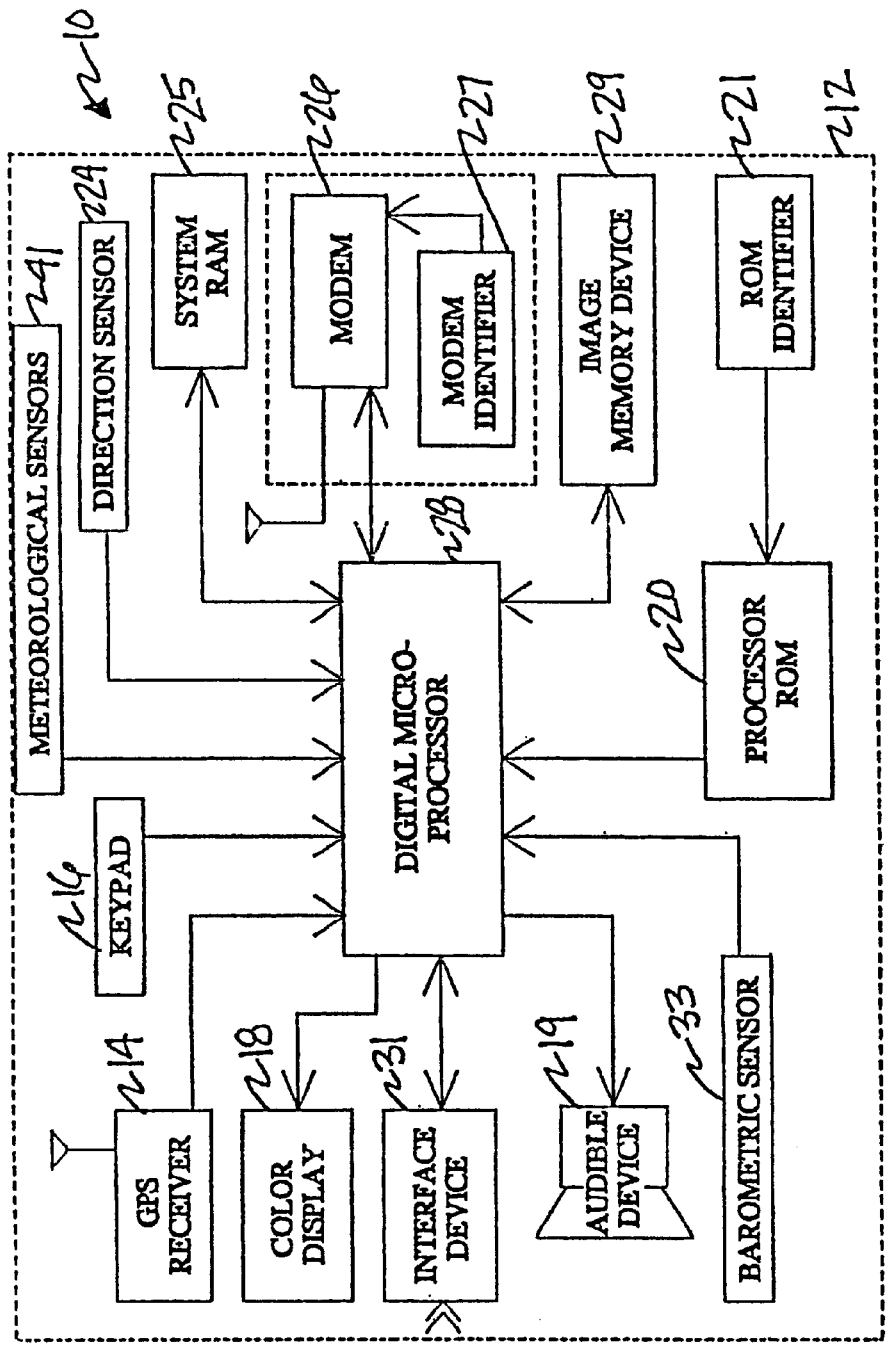
FIG. 3 is a schematic diagram of a hand-held embodiment of the mobile units of the present invention.
Figure 5:
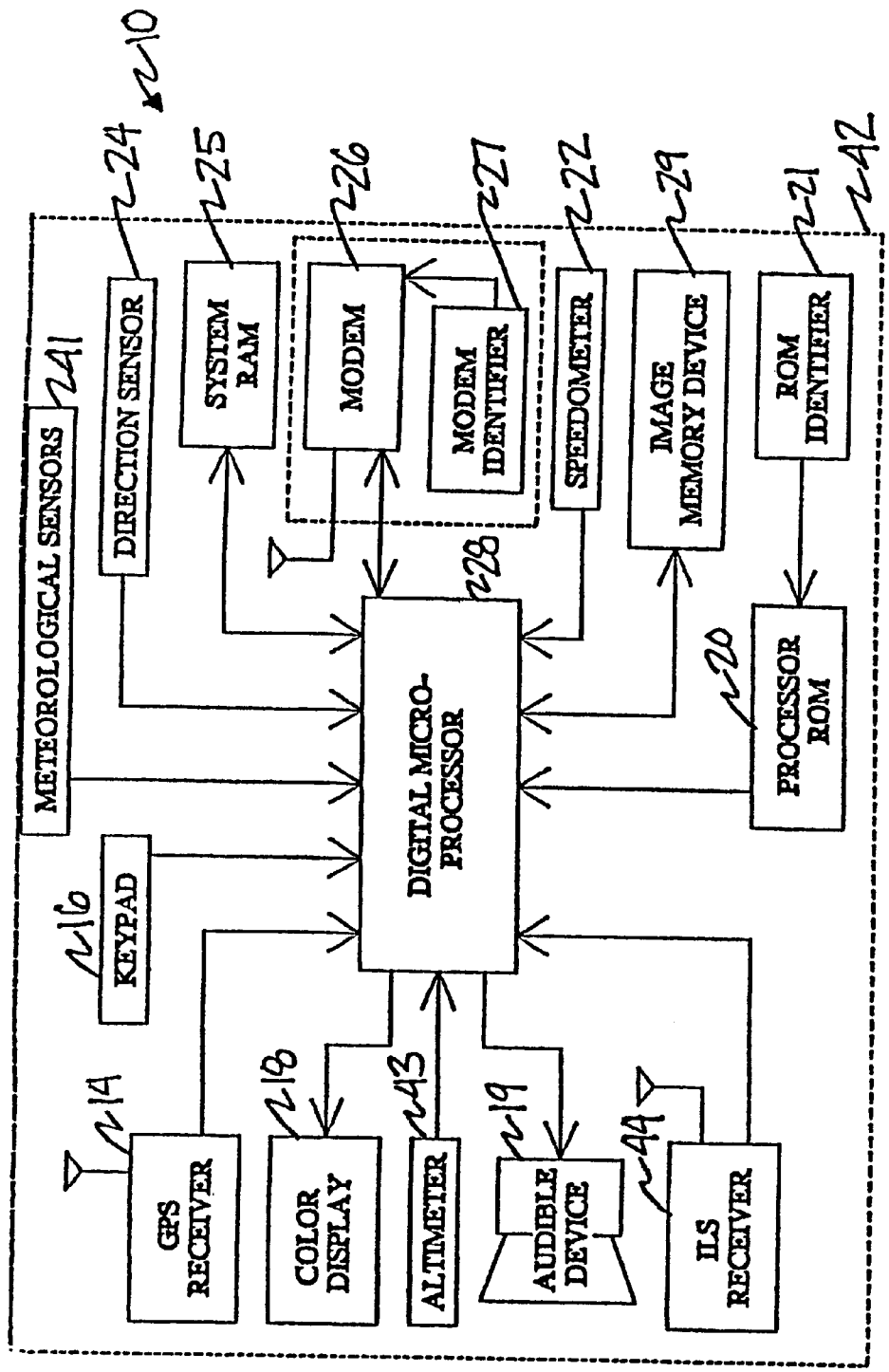
FIG. 5 is a schematic diagram of an aeronautical embodiment of the mobile units of the present invention.

As shown in FIG. 2, the mobile units also include a plurality of nautical mobile units 38 each mounted within a watercraft and further including a sonar receiver 40 for the purpose of transmitting current depth data to the central service provider 46. As noted with vehicular mobile units, the preferred embodiment may also include meteorological sensors 41 for collecting additional community data. The mobile units in FIG. 3 are shown to include a plurality of portable mobile units 12 each hand held and specifically include a weather forecast sensor 33. With reference now to FIG. 5, the mobile units are shown to include a plurality of aeronautical mobile units 42 each mounted within an aircraft and including an altimeter 43 and ILS receiver 44. The elevation, however, may be determined by utilizing the position demodulator 14 for accomplishing its task.

Figure 4:
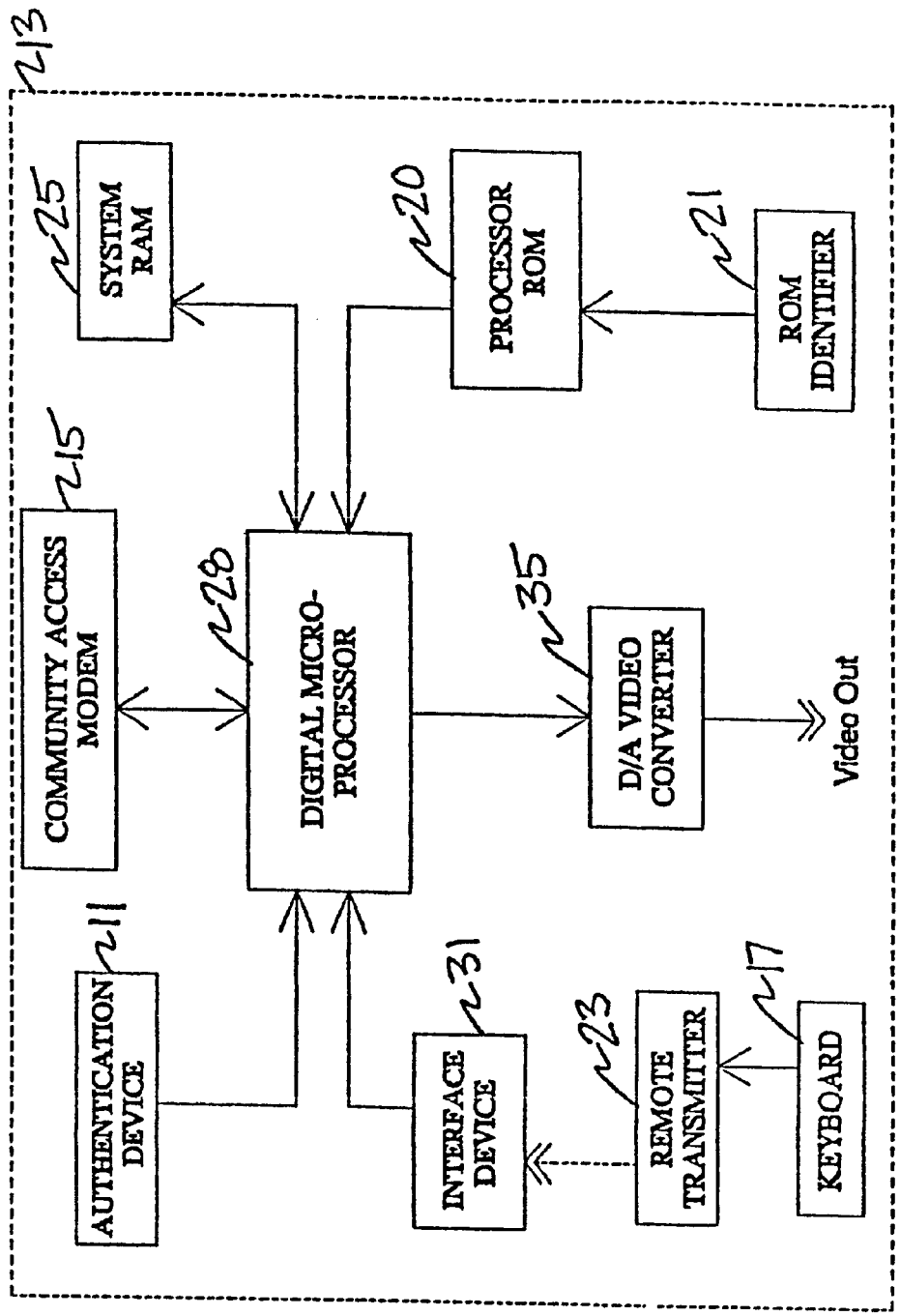
FIG. 4 is a schematic diagram of a fixed-based embodiment of the stationary units of the present invention.

An exception to the mobile units is shown in FIG. 4. The units include a plurality of fixed stationary units 13 and further include a keyboard 17 and transmitter 23 linked to the interface device 31 via free space. Further adapted is a digital to analog converter 35 for providing signals to a remote CRT display. A residential modem embodiment 15 is further adapted for transferring information through any wired or fixed-wireless community access medium. It should be noted that an authentication device 11 may be necessary for personal identification verification utilizing a biometric standard.

Figure 6:
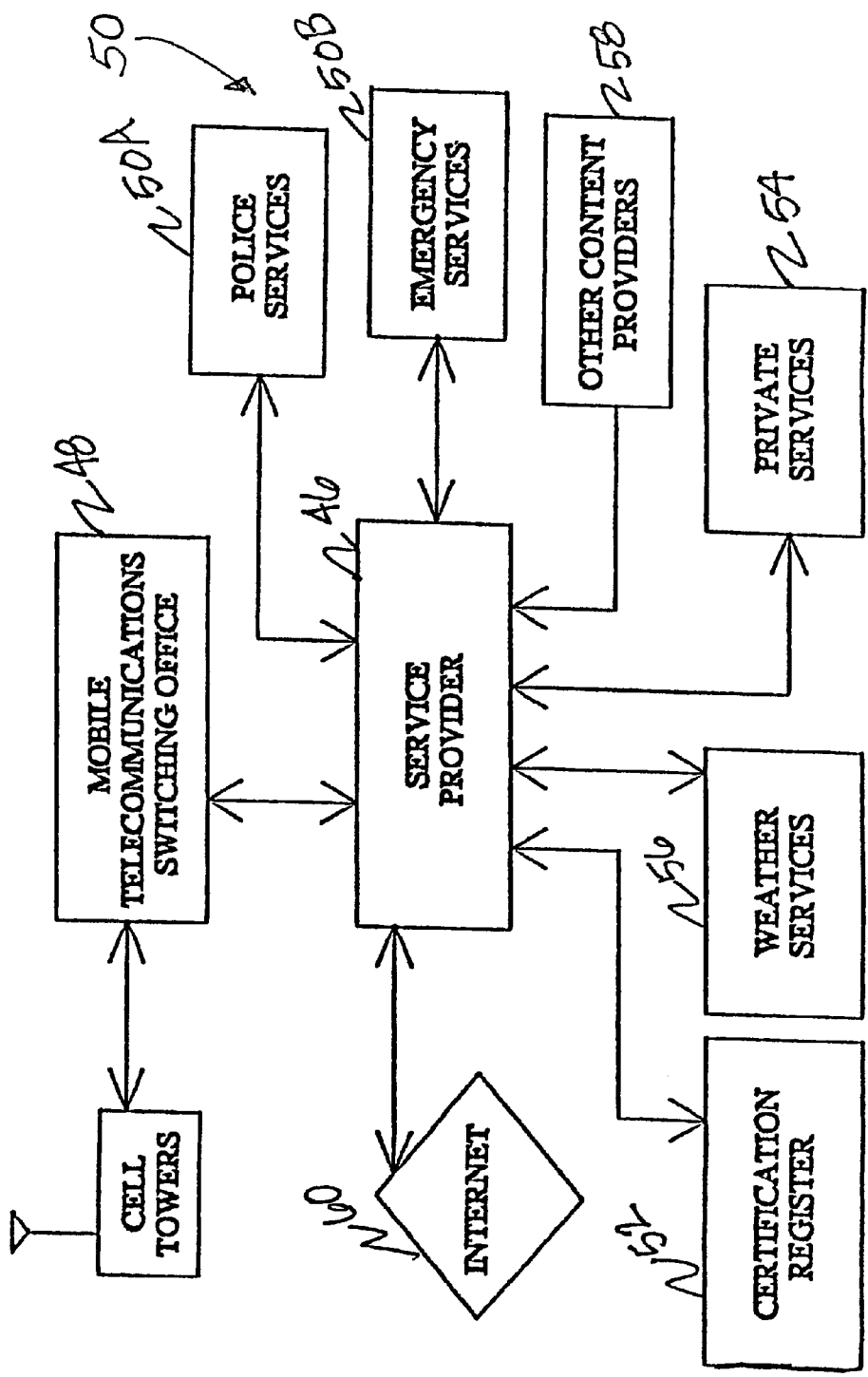
FIG. 6 is a schematic diagram of a central service provider of the present invention.

Also included is a central service provider 46 having a modem for transferring various information and control signals to and from the components of each of the mobile units via free space by way of a mobile communications switching office 48 as shown in FIG. 6. The capabilities of the service will now be set forth. First, the capabilities universal to each of the mobile units will be described. It should be noted that the service provider may be adapted to serve just vehicular units, nautical units, aeronautical units or any combination or part thereof. In addition, the service provider may be equipped in its apparatus to serve other types of mobile units including hand-held portable units and railroad mobile units or fixed display units and other central database units.

In use, the service provider 46 is database connected to an emergency (public service) agency 50 (such as, for example, police services 50A and emergency services 50B) for deploying a mobile emergency unit to a location of one of the mobile units. This may be effected upon the receipt of a predetermined emergency code via the keypad 16 of the mobile unit. In the preferred embodiment, the code consists of depressing at least two buttons for a defined sequential duration to prevent inadvertent actuation of the present invention. In an alternative embodiment, a set panic code may be initiated non-sequentially by a remote push-button device adapted for the interface 31 to quickly signal for an immediate police response to a violent incident (such as a highjacking). It should be noted that the relative location of the distressed mobile unit is also displayed to the mobile emergency unit as provided by the modulated positioning system. In the context of the present capability, the service provider is further adapted to transmit to the distressed mobile unit the current position of the mobile emergency unit to be depicted on the display 18. Such current position is preferably accompanied by the identity of the responding agency. Ideally, the service provider also supplies the selected mobile emergency unit with information about the certified registrant 52 of a specified mobile unit by way of the identification code combination 21 and 27.

As an additional option, the central service provider 46 may be further connected to a service agency 54 which may deploy persons in a manner similar to the emergency agency, but for the purpose of non-emergency service (i.e. vehicle repair or the like).

To request the assistance of the service agency, a service code is entered by depressing a unique pair of buttons on the keypad 16 which are different from those of the emergency code for a defined sequential duration.

In an alternate embodiment, the system may be adapted to allow a public service 50 or private service 54 agency to ascertain visually the location of the distressed mobile unit, the agency may be equipped with an enlarged display for depicting the location of the mobile unit with a map background. The agency 50 or 54 may in turn select its closest available mobile response unit visually from the fixed display for quick dispatch and rendezvous confirmation.

In another embodiment, the central service provider 46 is connected within its apparatus to a map serving database for transmitting to the mobile unit graphic map data to be depicted on the display 18. In the preferred embodiment, the display depicts a spatial map which is generated as a function of the position demodulator 14 and the depression of a map button on the keypad 16. Additional buttons preferably take the form of an unillustrated local button, midrange button, and far range button. In use, upon the depression of one of the aforementioned buttons, a status-map is depicted which is centered about the current location and aligned with respect to the forward motion of the mobile unit as indicated by the modulated positioning system. Consequently, the scale of the map is a function of which range button is depressed. As a further option, a set of orientation buttons may be included to allow manual scrolling of the map ahead, behind, to the left and to the right (or in the north, south, east and west directions) of the current location of the mobile unit, as indicated by the modulated positioning system. Finally, a navigation button may be incorporated to activate the voice recognition converter 36 for inquiring destinations vocally by name or address. In this method, a location map may depict a unique route marking in a different overlay color than the spatial map marking. Accordingly, such a designated path of travel may be updated and depicted as mentioned herein.

The central service provider 46 is further database connected to a weather forecast service 56. The service provider is thus adapted for transmitting to the mobile unit graphic weather data of a predetermined area for being depicted on the display 18. Ideally, the status-map depicted is generated as a function of the position demodulator 14 and the depression of weather buttons on the keypad 16 in a manner similar to that in which a spatial map is depicted. It should be understood that the same range and orientation buttons mentioned supra may function accordingly with any status-map inquiry. Therefore, in the present context, such buttons now allow a user to view an extended frame or location for the purpose of monitoring and tracking trends of current weather conditions. For an additional method of tracking trends, a replay button may be used in the selected scale of display to initiate a sequence of past status-maps of the area for depicting a phased pattern of conditions leading up to the current condition in the area. From such trends, impending weather conditions may be accurately predicted by the user. As an alternate method of selecting a pending area in which a forecast is given, an intended point in travel may be entered by way of a voice recognized inquiry whereupon the central service provider 46 transmits to the mobile unit a weather service graphic forecast at the selected location at the anticipated time of arrival. Alert forecasts may also be given at an intended time to a mobile unit for certain weather advisory locations which may be identified from a calculating method of probability in determining when and where the motion of the mobile unit and a notable hydrometeor vector may occupy the same area in the imminent future. At such a time, it may be warranted that the audible device 19 be activated to signal direct attention to the graphic display notice. Furthermore, at any given time, the service provider may also supply anonymous meteorological sensor data from the mobile units to the weather service for use in forecasting the weather.

While the foregoing functions of the service provider may be applied to any of the transportation means, the central service provider 46 may further provide additional features for a specific type of mobile unit. For example, the central service provider 46 generates the current graphic traffic data by means of its method of monitoring the collective movements of common mobile units employed within the service for providing continually updated status-map service to hand-held 12, vehicular, nautical 38, and aeronautical 42 mobile units. In use, the compiled traffic conditions may be depicted on the display 18 in a manner similar to that in which the maps and weather are depicted, as set forth hereinabove. In the alternative, a random path of travel may be entered by way of traffic buttons on the keypad 16. Given the proprietorship of various database servers, the service provider may transmit to the mobile unit 10 a spatial, weather or traffic status-map of the surrounding conditions along a random or intended path of travel whereby navigation to destination may be altered consequent to real-time events. From a public safety standpoint, however, the traffic status-maps transmitted to hand-held units may be restricted to only depict the relative position of approaching municipal transit and emergency response vehicles with spatial map definition.

The service provider 46 may also include spatial map information that is uniquely collected for a specific set of mobile units. For example, the service provider may be database connected to other content providers 58, such as a fixed shoreline radar system for the purpose of including positioning data of watercraft not employed within the service for use in generating omniscient traffic status-maps that are transmitted to the nautical mobile units 38 in the areas of most congestion. Also, the service provider may collect depth data from sonar receivers 40 for the purpose of validating a tidal status-map of an area surrounding the current location of the mobile unit as indicated by the modulated positioning system. It should be noted that radar target symbols and graphic depth data may be depicted collectively on the display 18. Other information options may include color graphic charts of surface water temperatures validated by the surrounding meteorological sensors 41 of other nautical units or even subsurface temperatures obtained from buoys and the like. In another embodiment, additional options unique to the nautical mobile units may depict a phased pattern of sea swells or highlighted spatial areas of color indicating prohibited boating and fishing areas. Furthermore, data collected from the Internet 60 may depict spatial areas of available dockage space at marinas and restaurants. The central service provider 46 may also respond to inquiries about indigenous fish, knot tying and mooring, boating regulations and safety, or first aid instructions by way of full-motion graphic demonstrations. Finally, the service provider may also afford timetable data regarding text information about the times of the sunrise or sunset or the high and low tides.

The capability of all of the mobile units to request emergency assistance is enhanced by additional features unique to the vehicular mobile units. For example, in one embodiment, the central service provider 46 may be further adapted for guiding a mobile emergency unit upon the receipt of either the indication of a collision by the vehicle impact sensor 32 or by manual keypad 16 activation. The deployment of a mobile police unit may further be initiated by the service provider upon the receipt of the indication by the vehicle theft detector 34 or the receipt of a predetermined panic code by way of the voice recognition analog to digital converter 36 or by way of the interface device 31.

Further options that may be included with the vehicular mobile units is the ability to afford additional information regarding highway and parking conditions, accidents, construction zones, businesses, landmarks, transportation centers, restaurants, lodging, gas stations, and any other location or associated address identified within a status-map server that becomes proprietary to the central service provider 46. In another embodiment of the invention as an exclusive option to authorized mobile units, live video may be received from various points and vehicle locations and also transmitted to a centralized fixed display unit per command request.

The aforementioned live video may also be employed with mobile units on trains. Such video cameras may be situated at railroad crossings and the like for viewing. A single toggle button may be incorporated for scrolling amongst the video cameras such that the engineer of the train may monitor upcoming grade crossings along a route which is traveled. Conversely, the central service provider 46 may transmit to the displays 18 of upcoming vehicular mobile units the relative position and numeric speed of the train as it approaches an unguarded crossing and, if necessary, signal an alert notification by way of the audible device 19 for indicating imminent vector contact. It should be noted that when the present invention is incorporated in trains, the modulated positioning system may be excluded and the position tracked merely by monitoring the speed and direction of the train on a track.

In the preferred embodiment, a plurality of video cameras are positioned at various locations, especially in areas of high crime. With such video cameras, the central service provider 46 may be used by a guardian to monitor potential crime areas from a single mobile unit 10. Further, images from the video cameras, including mobile retrofit cameras, may be transmitted to the displays of other authorized mobile and centralized fixed-based units for use by public 50 or private 54 security personnel.

It should be understood that the aforementioned services afforded by the service provider are just a few examples of how various information or action may be provided as a collective function of mobile unit components that are integrated with community servers via free space wherein graphic data is returned relative to the needs of the user. Furthermore, the central service provider 46 may be equipped in its apparatus to offer additional information needs from outside of its own proprietary databases to a user of any of the mobile units 10. Such information may take any form and be derived from any particular storage facility 58 including the Internet 60.

In the foregoing discussion, the central service provider 46 has been defined as a single entity which services every aspect of all of the mobile units. It should be understood, however, that the service provider may be divided into various separate providers each designated to provide certain services to a predetermined set of mobile units. This affords an increased level of security which is required with sensitive information. It also allows government intervention for regulating the flow of information and services. Yet another method of regulating the information being transmitted by the service providers is to validate the identification code. When the verification is used in such a manner, it may become critical that a variable code be stored in random access memory 25 and/or in an additional memory device 29 and constantly changed, as set forth hereinabove.

In another embodiment of the invention, the modem 26 of the mobile unit 10 may include a modular plug-in that includes a programmable radio frequency transceiver for the purpose of addressing a common set of public service providers via free space. The transceivers may further be variably programmed for the purpose of selecting a specific private service provider via free space. The programming may include also remote activation of the mobile unit via free space from the service provider for the purpose of identifying the location of the mobile unit on a map background to the registered owner or authorized parties as per validated request from a fixed stationary unit 13 or the like. The remote activation may further include set instructions for the purpose of controlling an automated vehicle function.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A traveling service system comprising, in combination:
   a plurality of mobile units each having a plurality of components including:
   a position demodulator adapted for determining a longitudinal coordinate and a latitudinal coordinate indicative of a current location of the mobile unit,
   a keypad for inputting selected data,
   a color liquid crystal display for displaying graphic images and data,
   an identification read only memory for storing an accessible code unique to the mobile unit ROM and modem,
   an audible device for notifying an alert,
   a speedometer for tracking a current speed of the mobile unit,
   a direction sensor for tracking a current direction of travel of the mobile unit,
   a peripheral interface connection for modem access of various personal information devices,
   a modem for transmitting and receiving data via free space, and
   a microprocessor connected between the position demodulator, keypad, color liquid crystal display, memory, audible device, speedometer, direction sensor, interface and modem, the microprocessor adapted to govern the transfer of information to and from the components of the mobile unit; and
   said mobile units including a plurality of vehicular mobile units each mounted within a dash of a vehicle and further including a vehicle impact sensor for indicating when a collision has occurred, an alarm system for indicating unauthorized use of the vehicle, and a voice recognition analog to digital converter for inputting data without the use of hands;
   said mobile units including a plurality of aeronautical mobile units each mounted within an aircraft and further including an altimeter and ILS receiver;
   said mobile units including a plurality of nautical mobile units each mounted within a watercraft and further including a sonar receiver and meteorological sensors for collecting additional community data; and
   a service provider having a modem for transferring various information and control signals to and from the components of each of the mobile units via free space;
   wherein the service provider is connected to an emergency and service agency for guiding a mobile emergency and service unit to a location of one of the mobile units upon the receipt of a predetermined code via the keypad, wherein the relative location is provided by a modulated positioning system, the service provider is further adapted to transmit graphic data to the mobile unit the current position of the mobile emergency and service unit to be depicted on the display along with the identity of a responding unit;

wherein the service provider is internally connected to a map database for transmitting to the mobile units graphic spatial data to be depicted on the display of an area manually entered via the keypad, such that current conditions in the area may be tracked;

wherein the service provider is further adapted for transmitting to the mobile units a spatial status-map of an area surrounding the current location of the mobile unit as indicated by the modulated positioning system;

wherein the service provider is further connected to a weather forecast service for transmitting to the mobile units graphic weather data to be depicted on the display of an area which is manually entered via the keypad, wherein past and current conditions in the area may be tracked;

wherein the service provider is further adapted for transmitting to the mobile units a weather status-map of an area surrounding the current location of the mobile unit as indicated by the modulated positioning system;

wherein the service provider is further adapted for guiding a mobile emergency unit to a location of one of the vehicular mobile units upon the receipt of at least one of the indication of a collision by the vehicle impact sensor, the receipt of the indication of unauthorized use of the vehicle, and the receipt of a predetermined code via voice or manual indication;

wherein the service provider creates a proprietary traffic status database for transmitting from the mobile units to the mobile units graphic traffic data to be depicted on the display of an area manually entered via the keypad, wherein past and current conditions in the area may be tracked;

wherein the service provider is connected to an additional monitoring system for supplementing status data to be depicted on the display of a mobile unit;

wherein the service provider is further adapted for transmitting to the mobile units a traffic status-map of an area surrounding the current location of the mobile unit as indicated by the modulated positioning system;

wherein the service provider is also adapted for additional alphanumeric symbol integration with a graphic status-map to be transmitted to the displays of the mobile units;

wherein a random path of travel may be entered by way of the keypad and the service provider transmits to the mobile unit a graphic status-map of conditions at points along the path of travel;

wherein a random time of travel may be entered by way of the keypad and the service provider transmits to the mobile unit a graphic status-map of pending conditions at locations relative to the path of travel;

wherein an intended time of travel may be entered by way of voiced commands and the service provider transmits to the mobile unit a forecast status-map of pending conditions relative to an anticipated time of travel;

wherein an intended path of travel may be entered by way of voiced commands and the service provider transmits to the mobile unit a forecast status-map of navigational points to destination along a guided path of travel.

2. A service system comprising:

a plurality of mobile units each having a plurality of components including:

a position demodulator for determining a longitudinal coordinate and a latitudinal coordinate indicative of a current location of the mobile unit, a modem for transmitting and receiving data via free space, a keypad for inputting selected data, a display for displaying graphic images and data, a speedometer for tracking a current speed of the mobile unit, a direction sensor for tracking a current direction of travel of the mobile unit, an identification read only memory for storing an accessible code unique to the mobile unit ROM and modem, an audible device for notifying an alert, a peripheral interface connection for modem access of various personal information devices, a microprocessor for governing the transfer of information to and from the components of the mobile unit; and a central service provider for generating and transferring various information and control signals to and from the components of each of the mobile units via free space;

wherein the service provider is database connected to a vehicle certification register for validating the identity of this mobile unit as authorized for proprietary data transfer;

a plurality of stationary units each having a plurality of components including:

a modem for transmitting and receiving data via a community access medium, a keyboard for inputting selected data, a converter for displaying graphic images and data in a digital or analog signal format, an identification read only memory for storing an accessible code unique to the stationary unit ROM, an authentication device for identification and authorization of the user, a microprocessor for governing the transfer of information to and from the components of the stationary unit; and a central service provider for generating and transferring information to and from the components of each of the stationary units via a community access medium;

a central service provider having a modem for transferring information to and from the components of each of the stationary units via a community access medium;

wherein the service provider is connected within its apparatus to an authenticity serving database for validating the identity of the stationary unit user as authorized for proprietary data transfer;

wherein the service provider is connected to a weather forecast service for transmitting to the stationary units graphic weather data to be depicted on the display of an area which is manually entered via the keyboard, wherein past and current conditions in an area may be tracked;

wherein the service provider generates a proprietary traffic status database from the mobile units for transmitting to the stationary units graphic traffic data to be depicted on the display of an area manually entered via the keyboard, wherein past and current conditions in an area may be tracked; and wherein the path of travel from a specific mobile unit may be entered via the keyboard and the service provider transmits to the stationary unit a graphic status-map of location.

3. A service system as set forth in claim 2 wherein said mobile units include a plurality of vehicular mobile units each mounted within a terrestrial vehicle.

4. A service system as set forth in claim 2 wherein said mobile units include a plurality of nautical mobile units each mounted within a watercraft and further including a sonar receiver for indicating a current depth data to said service provider.

5. A service system as set forth in claim 2 wherein said mobile units include a plurality of aeronautical mobile units each mounted within an aircraft and further including an ILS receiver.

6. A service system as set forth in claim 2 wherein said mobile units include a plurality of railroad mobile units each mounted within a train.

7. A service system as set forth in claim 2 wherein said mobile units include a plurality of portable mobile units each hand held.

8. A service system as set forth in claim 2 wherein said stationary units include a plurality of fixed-based units each at a residential site location.

9. A service system as set forth in claim 3 and further including a vehicle impact sensor for indicating when a collision has occurred.

10. A service system as set forth in claim 3 and including an alarm system for indicating unauthorized use of the vehicle.

11. A service system as set forth in claim 2, wherein said plurality of mobile units include meteorological sensors for indicating current weather data to said service provider.

12. A service system as set forth in claim 3 and including a voice recognition analog to digital converter for inputting data without the use of hands.

13. A service system as set forth in claim 2 wherein said service provider is connected to an emergency and service agency for guiding a mobile emergency and service unit to the location of a specified mobile unit upon the receipt of a predetermined code, wherein the location is provided by the modulated positioning system.

14. A service system as set forth in claim 13 wherein said service provider is adapted to transmit to said emergency and service agency and its mobile units the relative position of said specified mobile unit to be depicted on the displays.

15. A service system as set forth in claim 13 wherein said service provider is further adapted to transmit to said emergency and service agency and any specified mobile units the relative position of said mobile emergency and service unit to be depicted on the displays along with the identity of the responding units.

16. A service system as set forth in claim 2 wherein said service provider is connected to a map database for transmitting to the mobile and stationary units graphic spatial patterns to be depicted on the displays, the map being of an area manually requested.

17. A service system as set forth in claim 2 wherein said service provider creates the proprietary traffic status database from said mobile units for transmitting to the mobile and stationary units graphic traffic patterns to be depicted on the displays.

18. A service system as set forth in claim 2 wherein said service provider is further connected to said weather forecast service for transmitting to said mobile and stationary units graphic weather patterns to be depicted on the displays.

19. A service system as set forth in claim 16 wherein said service provider is connected to said map database for transmitting to said mobile units a spatial status-map of an area surrounding the current location of the mobile unit as indicated by the modulated positioning system.

20. A service system as set forth in claim 17 wherein said service provider is connected to said proprietary traffic status database for transmitting to said mobile units a traffic status-map of an area surrounding the current location of the mobile unit as indicated by the modulated positioning system.

21. A service system as set forth in claim 18 wherein said service provider is further connected to said weather forecast service for transmitting to said mobile units a weather status-map of an area surrounding the current location of the mobile unit as indicated by the modulated positioning system.

22. A service system as set forth in claim 18 wherein said service provider is further connected to said weather forecast service and the service provider transmits to said mobile and stationary units a weather watch or warning notification.

23. A service system as set forth in claim 8 wherein the service provider is further adapted to transmit to said stationary units a past and a current position of a selected mobile unit to be depicted on the display, wherein the relative location is provided by the modulated positioning system.

24. A service system as set forth in claim 2 wherein said mobile units include a plurality of retrofit cameras and is adapted to said peripheral interface for the purpose of video data transfer from the cameras to said service provider to the displays of selected mobile and stationary units.

25. A traveling service system as set forth in claim 1 wherein said service provider is connected to said traffic status database which compares a mobile unit vector to another vector for the purpose of calculating the probability said vectors will simultaneously occupy the same location.

26. A traveling service system as set forth in claim 25 wherein the service provider is further adapted in its apparatus to transmit to the mobile units an alert notification of imminent vector contact.

27. A traveling service system as set forth in claim 1 wherein said service provider is further adapted to transmit to the mobile units an alert notification of navigation.

28. A traveling service system as set forth in claim 1 wherein said plurality of mobile units include a modem of modular design for interchange ability amongst a common set of mobile units.

29. A traveling service system as set forth in claim 1 wherein said plurality of mobile units include meteorological sensors for transmitting to said service provider the collected weather data at the current location of the mobile unit as indicated by the modulated positioning system.

30. A traveling service system as set forth in claim 29 wherein said service provider is adapted for transmitting to a weather forecast service said collected meteorological data from locations at the mobile units for the purpose of calculating the probable weather.

31. A service system as set forth in claim 2 wherein said service provider is adapted for character symbol generation and integration with all its graphic serving databases for providing additional message content to the displays of the mobile and stationary units.

32. A service system as set forth in claim 2 wherein said service provider is adapted for proprietary memory storage of graphic images and alphanumeric data associated to all mobile and stationary units employed within its server databases.

33. A traveling service system as set forth in claim 28 wherein each of said modems includes a programmable radio frequency transceiver for the purpose of addressing a common set of service providers via free space.

34. A traveling service system as set forth in claim 33 wherein said programmable radio frequency transceivers include variable programming for the purpose of selecting a specific service provider via free space.

35. A traveling service system as set forth in claim 34 wherein said variable programming includes remote activation of the mobile unit via free space from the service provider for the purpose of identifying the location of the mobile unit on a map background to the registered owner and authorized parties as per validated request.

36. A traveling service system as set forth in claim 35 wherein said remote activation includes set instructions for the purpose of controlling vehicle functions as per validated request.

* * * * *